US005999337A

United States Patent [19]
Ozaki

[11] Patent Number: 5,999,337
[45] Date of Patent: Dec. 7, 1999

[54] LENS SYSTEM FOR ELECTRONIC PHOTOGRAPHY

[75] Inventor: Hiroyasu Ozaki, Tokyo, Japan

[73] Assignee: Asahi Kogaku Kogyo Kabushiki Kaisha, Tokyo, Japan

[21] Appl. No.: 09/173,687

[22] Filed: Oct. 16, 1998

[30] Foreign Application Priority Data

Oct. 21, 1997 [JP] Japan ..................................... 9-288333

[51] Int. Cl.$^6$ .................................................. G02B 13/02
[52] U.S. Cl. ........................... 359/793; 359/740; 359/753; 359/783; 359/708
[58] Field of Search ...................................... 359/663, 691, 359/740, 749, 752–753, 761, 762, 770, 783, 793

[56] References Cited

U.S. PATENT DOCUMENTS

| | | | |
|---|---|---|---|
| 5,155,629 | 10/1992 | Ito et al. | 359/676 |
| 5,477,389 | 12/1995 | Ito et al. | 359/752 |
| 5,513,045 | 4/1996 | Ito et al. | 359/750 |
| 5,546,232 | 8/1996 | Hirakawa | 359/691 |
| 5,684,643 | 11/1997 | Enomoto et al. | 359/751 |
| 5,706,141 | 1/1998 | Abe | 359/793 |

Primary Examiner—Georgia Epps
Assistant Examiner—David N. Spector
Attorney, Agent, or Firm—Greenblum & Bernstein, P.L.C.

[57] ABSTRACT

A photographic lens system composed of a negative first lens group, a diaphragm, and a positive second lens group, in this order from the object side. The second lens group has a positive meniscus lens element having a convex surface facing the image side, a cemented sub-lens group having a positive lens element and a negative lens element, and a positive single lens element, in this order from the object side, wherein the photographic lens system satisfies the following conditions:

$$1.5 < |f_1|/f < 5.0 \tag{1}$$

$$1.1 < f_2/f < 2.0 \tag{2}$$

$$0.6 < D_{AS}/f_2 < 1.2 \tag{3}$$

wherein f designates the focal length of the entire optical system;
  $f_1$ designates the focal length of the first lens group;
  $f_2$ designates the focal length of the second lens group;
  $D_{AS}$ designates the distance from the diaphragm to the first principal point of the second lens group.

6 Claims, 5 Drawing Sheets

———— d LINE
········ g LINE
– – – – c LINE

-0.05  0.05

SPHERICAL
ABERRATION

CHROMATIC
ABERRATION

LATERAL
CHROMATIC
ABERRATION

ASTIGMATISM

DISTORTION

—— d LINE
······ g LINE
- - - - c LINE

-0.05  0.05

SPHERICAL
ABERRATION

CHROMATIC
ABERRATION

LATERAL
CHROMATIC
ABERRATION

ASTIGMATISM

DISTORTION

Fig. 5

SPHERICAL ABERRATION
CHROMATIC ABERRATION

LATERAL CHROMATIC ABERRATION

ASTIGMATISM

DISTORTION

Fig. 7

Fig. 8A — SPHERICAL ABERRATION CHROMATIC ABERRATION
Fig. 8B — LATERAL CHROMATIC ABERRATION
Fig. 8C — ASTIGMATISM
Fig. 8D — DISTORTION

SPHERICAL
ABERRATION

CHROMATIC
ABERRATION

LATERAL
CHROMATIC

ASTIGMATISM

DISTORTION

LENS SYSTEM FOR ELECTRONIC PHOTOGRAPHY

BACKGROUND OF THE INVENTION

1. Field of the Invention

The present invention relates to a photographic lens system mainly for use in an electronic still camera having a charge-coupled device (CCD).

2. Description of the Related Art

In a miniature CCD camera such as an electronic still camera, due to advancements in CCD production technologies, a size of pixel has been reduced, so that a CCD with great high-density to the point of approximately one million pixels has been utilized. Accordingly, in order to correspond to such a high-density CCD, the CCD camera requires a photographic lens system having very high resolution and high optical performance. Furthermore, along with the pursuit of improved optical performance, there is a strong demand for further miniaturization and cost reduction. Also, in a CCD camera for color photography, in order to prevent irregular color distribution, the so-called telecentricity of incident light rays is required, i.e., the light rays emitted through the photographic lens system are made incident on the CCD as perpendicular as possible. In addition, in a CCD camera, since optical elements such as a low-pass filter and an infrared-cut filter have to be installed in a space provided between the photographic lens system and the CCD, a sufficiently long back focal distance is required.

In photographic lens systems of the prior art utilized in CCD cameras, the above-mentioned requirements are not simultaneously and sufficiently met, which has left room for improvement.

SUMMARY OF THE INVENTION

It is an object of the present invention to provide a photographic lens system (i) having high optical performance, (ii) a long back focal distance, (iii) sufficient telecentricity, and (iv) being compact and produced at low cost.

In order to attain the above-mentioned object, according to the present invention, there is provided a photographic lens system composed of a negative first lens group (having negative refractive power), a diaphragm, and a positive second lens group (having positive refractive power), in this order from the object. The second lens group has a positive meniscus lens element having a convex surface facing the image, a cemented sub-lens group having a positive lens element and a negative lens element, and a positive single lens element, in this order from the object, wherein the photographic lens system satisfies the following conditions:

$$1.5 < |f_1|/f < 5.0 \quad (1)$$

$$1.1 < f_2/f < 2.0 \quad (2)$$

$$0.6 < D_{AS}/f_2 < 1.2 \quad (3)$$

wherein f designates the focal length of the entire optical system;
$f_1$ designates the focal length of the first lens group;
$f_2$ designates the focal length of the second lens group;
$D_{AS}$ designates the distance from the diaphragm to the first principal point of the second lens group.

A negative lens element in the first lens group preferably has an aspheric surface formed on at least one of the lens surfaces, and the aspheric surface satisfies the following condition:

$$-1.0 < \Delta V_{asp} < -0.2 \quad (4)$$

wherein $\Delta V_{asp}$ designates the amount of change of the spherical aberration coefficient of the negative lens element of the first lens group due to the aspherical surface under the condition that the focal length of the entire lens system is converted to 1.0.

In the first lens group, the negative lens element having the aspherical surface is arranged to be closest to the object, and further the object-side surface of the negative lens element is preferably formed as the aspheric surface.

The photographic lens system according to the present invention preferably satisfies the following condition:

$$-1.5 < R_{2-2}/f < -0.7 \quad (5)$$

wherein $R_{2-2}$ designates the radius of curvature of the image side surface of the positive meniscus lens element in the second lens group.

The photographic lens system according to the present invention referably satisfies the following conditions:

$$20 < v_p - v_N \quad (6)$$

$$0.05 < N_n - N_p < 0.35 \quad (7)$$

wherein $v_p$ designates the Abbe number, with respect to the d-line, of the positive lens element of the cemented sub-lens group in the second lens group;
$v_n$ designates the Abbe number, with respect to the d-line, of the negative lens element of the cemented sub-lens group in the second lens group;
$N_p$ designates the refractive index, with respect to the d-line, of the positive lens element of the cemented sub-lens group in the second lens group;
$N_n$ designates the refractive index, with respect to the d-line, of the negative lens element of the cemented sub-lens group in the second lens group.

In relation to the above photographic lens system, in a retrofocus type lens system having a negative first lens group and a positive second lens group in this order from the object, the second lens group preferably functions as a focusing lens group (a rear-focus type) though both the first and second lens groups theoretically function as the focusing lens groups in such a retrofocus type lens system.

The present disclosure relates to subject matter contained in Japanese Patent Application No. 9-288333 (filed on Oct. 21, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

The photographic lens system of the present invention is a retrofocus lens system composed of, in order from the object, a negative first lens group (having negative refractive power), and a positive second lens group (having positive refractive power), and a diaphragm provided between the first and second lens groups. Furthermore, the second lens group is composed of, in order from the object, a positive meniscus lens element having a convex surface facing the image, a cemented sub-lens group having a positive lens element and a negative lens element, and a positive single lens element.

The inventor of the present invention has discovered that in order to achieve adequate telecentricity and high optical performance while the compactness of the photographic lens system is maintained, a diaphragm is provided between the first and second lens groups, the position of which should in particular be selected with respect to the second lens group. Moreover, the inventor has discovered that the most object-side lens element in the second lens group is preferably arranged to be formed as a positive meniscus lens element having a convex surface facing the image.

Furthermore, if a cemented sub-lens group composed of a positive and negative lens elements is provided in the second lens group, not only can chromatic aberration be adequately corrected, but also deterioration of optical performance due to error caused at production process can also be reduced.

In addition, it has been known that negative distortion tends to occur in the retrofocus type lens system having a negative lens element and a positive lens element (in this order from the object). In order to correct the above explained negative distortion, according to the present invention, at least one surface of negative lens elements of the first lens group is formed as an spherical surface.

Furthermore, since the second lens group is utilized as a focusing lens group (a rear-focus type), an weight-reduction of the focusing lens group can be attained, and sufficient peripheral rays are able to be secured.

Condition (1) determines the ratio between the power of the first lens group and that of the whole lens system. In order to attain a longer back focal distance, it is preferable that a strong negative power is give to the first lens group so that condition (1) is satisfied.

If the negative power of the first lens group becomes too strong to the extent that $|f_1|/f$ is lower than the lower limit, it is suitable to secure a longer back focal distance. However, in such a situation, the Petzval sum becomes too small. Then, the image plane is bent in the positive direction, i.e., toward the object side, and astigmatism becomes excessive to the extent that the correction thereof becomes difficult.

Conversely, if the negative power of the first lens group is too weak with respect to the entire lens system to the extent that $|f_1|/f$ is higher than the upper limit, it is difficult to obtain a longer back focal distance, which means that the photographing lens system is not suitable for a CCD camera.

Condition (2) determines the ratio between the power of the second lens group and the power of the entire lens system. When condition (2) is satisfied, the bundle of ray diverged by the negative power of the first lens group can be formed as an image through the positive second lens group while the correcting of aberrations is satisfactorily made.

If the power of the second lens group becomes too strong to the extent that $f_2/f$ is lower than the lower limit, a longer back focal distance becomes unobtainable, and furthermore, spherical aberration and coma become excessive.

If the power of the second lens group becomes too weak to the extent that $f_2/f$ is higher than the upper limit, the entire length of the lens system becomes longer, which results in the hindering of possible miniaturization of the photographic lens.

Condition (3) determines the position of the diaphragm with respect to the second lens group. When the diaphragm is positioned so that condition (3) is satisfied, the emission angle of the principal ray at the first lens group is reduced (i.e., the principal ray is made substantially parallel with the optical axis) and sufficient telecentricity can be maintained.

If the distance from the diaphragm to the principal point of the second lens group is made shorter to the extent that $D_{AS}/f2$ is lower than the lower limit, the emission angle of the principal ray becomes larger, which results in the worsening of telecentricity.

If the distance from the diaphragm to the principal point of the second lens group is made longer to the extent that $D_{AS}/f_2$ is higher than the upper limit, the diameter of the second lens group has to be made larger, and hence, miniaturization of the photographic lens cannot be attained.

Condition (4) determines the aspheric surface formed on at least one surface of the negative lens elements in the first lens group. The power of the photographic lens system according to the present invention is not symmetrically distributed with respect to the diaphragm, and off-axial aberrations can easily occur due to the strong negative power of the first lens group. In particular, in order to correct negative distortion, it is preferable to form an aspherical surface with diverging effects on a negative lens element in the first lens group. More concretely, the aspherical surface with diverging effects is preferably formed so that condition (4) is satisfied and the negative radius of curvature is made smaller toward the periphery of the aspherical surface.

If $V_{asp}$ is higher than the upper limit, negative distortion is under corrected.

If $V_{asp}$ is lower than the lower limit, negative distortion is over corrected.

Furthermore, in the first lens group, if the negative lens element having the aspheric surface is the most object-side lens element, and if the aspherical surface is formed on the most object-side surface of the most object-side lens element, the correcting of distortion is more easily made.

The relation between aspherical surface coefficient and aberration coefficient will be described.

1. The aspherical surface is generally defined as follows:

$$x = cy^2/\{1+[1-(1+K)c^2y^2]^{1/2}\} + A4y^4 + A6y^6 + A8y^8 + A10y^{10} + \ldots$$

wherein, y designates a distance from the optical axis;

x designates a distance from a tangent plane of an aspherical vertex;

c designates a curvature of the aspherical vertex (1/r);

K designates a conic constant;

A4 designates a fourth-order aspherical coefficient;

A6 designates a sixth-order aspherical coefficient;

A8 designates a eighth-order aspherical coefficient; and

A10 designates a tenth-order aspherical coefficient;

2. In this equation, to obtain the aberration coefficient, the following substitution is done to replace K with "0" (Bi=Ai when K=0).

B4=A4+Kc³/8

B6=A6+(K²+2K) c⁵/16

B8=A8+5 (K³+3K²+3K) c⁷/128

B10=A10+7 (K⁴+4K³+6K²+4K) c⁹/256

Then, the following equation is obtained.

$$x = cy^2/\{1+[1-c^2y^2]^{1/2}\} + B4y^4 + B6y^6 + B8y^8 + B10y^{10} + \ldots$$

3. When the focal length f is normalized to be 1.0, the resultant value is transformed as follows. Namely, substitute the following equations into the above equation:

X=x/f, Y=y/f, C=fc

α4=f³B4, α6=f⁵B6, α8=f⁷B8, α10=f⁹B10

In this way, the following equation is obtained.

$$X = CY^2/\{1+[1-C^2Y^2]^{1/2}\} + \alpha 4Y^4 + \alpha 6Y^6 + \alpha 8Y^8 + \alpha 10Y^{10} + \ldots$$

The second and subsequent terms define the amount of asphericity of the aspherical surface.

4. Then, Φ=8 (N' −N) α 4 is defined, and the third order aberration coefficients are as follows:

I designates the spherical aberration coefficient,

II designates the coma coefficient,

III designates the astigmatism coefficient,

IV designates the sagittal field of curvature coefficient,

V designates the distortion coefficient.

Then, the third order aberration contributions due to the fourth order aspherical coefficient α 4 are obtained as follows:

ΔI=h⁴Φ

ΔII=h³k Φ

ΔIII=h²k²Φ

ΔIV=h²k²Φ

ΔV=hk³Φ wherein h designates the height at which a paraxial axial ray is made incident on the aspherical surface; and k designates the height at which a paraxial off-axis ray (from the off axis object point) through the center of the entrance pupil is made incident on the aspherical surface;

N designates the refractive index of a substance on the object side of (proceeding) the aspherical surface; and N' designates the refractive index of a substance on the image side of (following) the aspherical surface.

Condition (5) determines the radius of curvature on the image-side surface of the object-side positive lens element in the second lens group.

If the above defined radius of curvature of the positive lens element becomes smaller to the extent that $R_{2-2}/f$ is lower than the lower limit, the machining cost of the lens increases.

If the above defined radius of curvature of the positive lens element becomes larger to the extent that $R_{2-2}/f$ is higher than the upper limit, the maintaining of telecentricity, and the shortening of the overall length of the lens system become difficult.

Condition (6) determines the difference in the Abbe numbers of the positive and negative lens elements which constitute the cemented sub-lens group in the second lens group. In combination with condition (7), by selecting the lens materials of positive and negative lens elements appropriately, aberrations can be corrected in a well balanced manner.

If $v_p - v_N$ is lower than the lower limit, correction of chromatic aberration in the second lens group becomes in particular difficult. It is noted that the order of arrangement of the positive and negative lens element in the cemented sub-lens group is not specifically required.

Condition (7) determines the difference of the refractive indices of the above-mentioned positive and negative lens elements in the cemented sub-lens group.

If $N_n - N_p$ is lower than the lower limit, spherical aberration is under corrected, and coma becomes excessive.

If $N_n - N_p$ is higher than the upper limit, it becomes difficult to curb the occurrence of field curvature and astigmatism to a minimum.

Specific numerical data of the embodiments will be described below through the tables and diagrams. $F_{NO}$ designates the F-number, f designates the focal-length, W designates the half angle of view, and $f_B$ designates the back focal distance considered to be a reduced distance (i.e., divided by the refractive index of the cover glass CG). R designates the radius of curvature of each lens surface, D designates the lens thickness or distance, $N_d$ designates the refractive index with respect to the d-line, and v designates the Abbe number with respect to the d-line. The d, g and c lines designate chromatic aberration and lateral chromatic aberration, both of which are represented by spherical aberration at the respective wave length. S designates the sagittal image, and M designates the meridional image.

Embodiment 1

Figure 1:
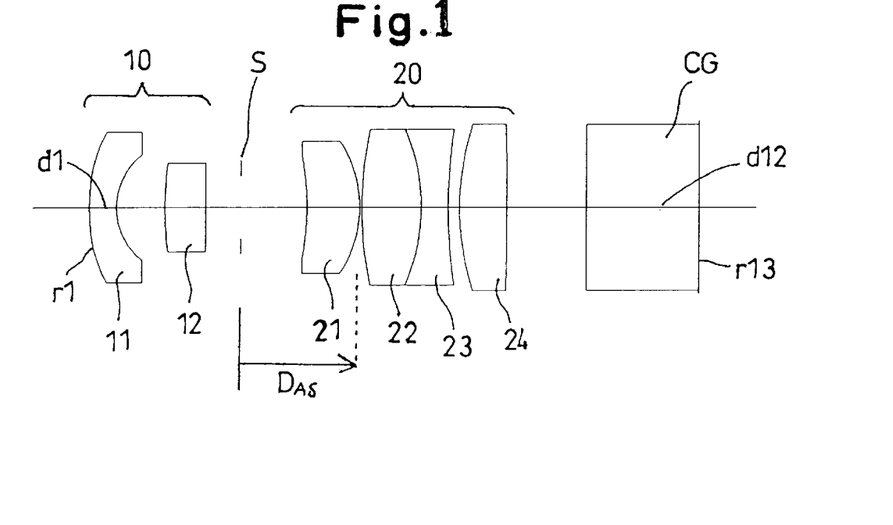
FIG. 1 is a lens arrangement of the first embodiment according to the present invention.
Figures 2A, 2B:
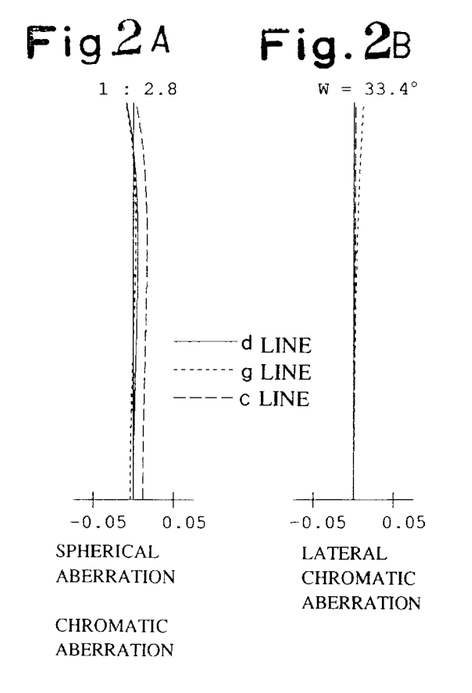
FIGS. 2A, 2B, 2C and 2D are aberration diagrams of the hotographic lens system in FIG. 1.
Figure 2C:
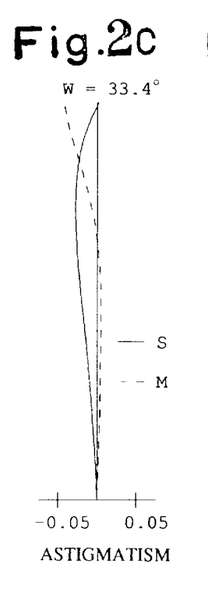
Figure 2D:
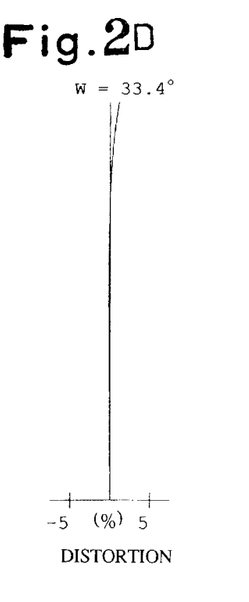

FIGS. 1 and 2 show the first embodiment of the photographic lens system according to the present invention. FIG. 1 is a lens arrangement which is composed of, in order from the object side, a negative first lens group 10, a diaphragm S, and a positive second lens group 20. The first lens group 10 is composed of, in order from the object side, a negative meniscus lens 11 having a convex surface facing the object side, and a positive single lens element 12 having convex surfaces. The second lens group 20 is composed of, in order from the object side, a positive meniscus lens element 21 having a convex surface facing the image side, a cemented sub-lens group having a positive lens element 22 and a negative lens element 23, and a positive single lens element 24 having convex surfaces. Behind the second lens group 20, a cover glass CG of the CCD is positioned, and the imaging plane of the CCD is arranged to meet the image side surface (r13) of the cover glass CG. $f_B$ designates the reduced distance between the image-side surface of the final lens element in the second lens group 20 and the imaging plane. FIGS. 2A, 2B, 2C and 2D show aberration diagrams of the photographic lens system, and Table 1 shows the numerical data.

TABLE 1

$F_{NO} = 1:2.8$
$f = 5.40$
$W = 33.4$
$f_B = 6.84 \, (d_{11} + d_{12}/1.51633)$
$D_{AS} = 5.63$
$\Delta V_{asp} = -0.454$

| Surface No. | R | D | Nd | ν |
|---|---|---|---|---|
| 1* | 9.119 | 1.20 | 1.66910 | 55.4 |
| 2 | 2.944 | 2.12 | — | — |
| 3 | 14.900 | 1.80 | 1.84666 | 23.8 |
| 4 | −158.000 | 1.54 | — | — |
| Diaphragm | ∞ | 2.87 | — | — |
| 5 | −11.166 | 2.30 | 1.58913 | 61.2 |
| 6 | −5.310 | 0.10 | — | — |
| 7 | 16.042 | 2.65 | 1.77250 | 49.6 |
| 8 | −8.263 | 1.20 | 1.84666 | 23.8 |
| 9 | 21.273 | 0.51 | — | — |
| 10* | 9.969 | 2.15 | 1.75500 | 45.5 |
| 11 | −128.547 | 3.54 | — | — |
| 12 | ∞ | 5.00 | 1.51633 | 64.1 |
| 13 | ∞ | — | — | — |

*indicates the aspherical surface which is symmetrical with respect to the optical axis.

The aspherical data (aspherical coefficients which are not indicated are zero):

No. 1: $K=0.00$, $A4=0.13536\times10^{-2}$, $A6=-0.20128\times10^{-4}$ $A8=0.19772\times10^{-5}$ No. 10: $K=-1.00$, $A4=-0.39891\times10^{-3}$, $A6=0.97240\times10^{-5}$ $A8=-0.44165\times10^{-6}$ Embodiment 2

Figure 3:
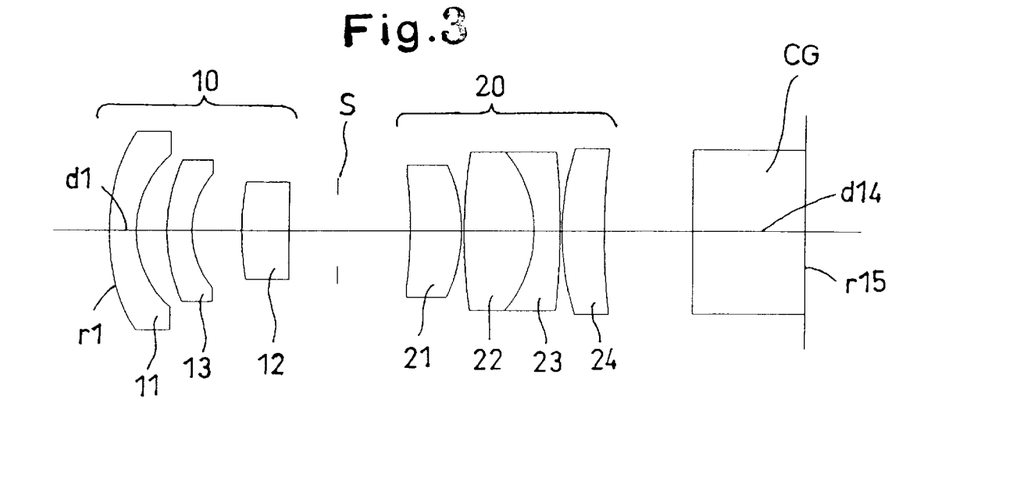
FIG. 3 is a lens arrangement of the second embodiment according to the present invention.
Figures 4A, 4B:
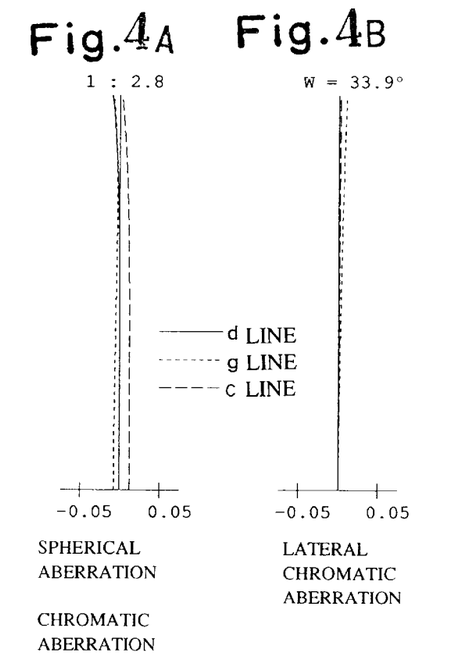
FIGS. 4A, 4B, 4C and 4D are aberration diagrams of the photographic lens system in FIG. 3.
Figure 4C:
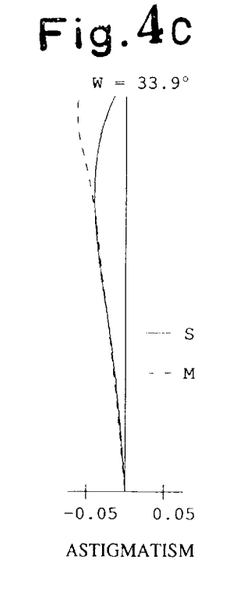
Figure 4D:
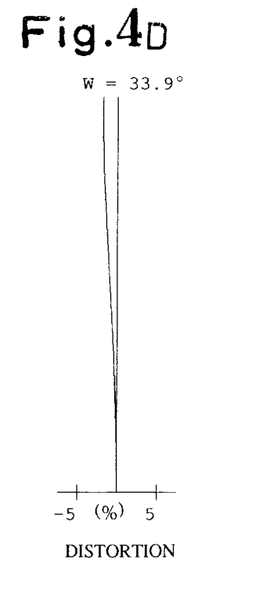

FIGS. 3 and 4 show the second embodiment of the photographic lens system according to the present invention. FIG. 3 is a lens arrangement, FIGS. 4A, 4B, 4C and 4D are aberration diagrams, and Table 2 shows the numerical data. In comparison with the first embodiment, in the first lens group 10, between the negative meniscus lens element 11 and the positive single lens element 12, a negative meniscus lens element 13 having the convex surface facing the object side is added as the third lens element, and in the second lens group 20, a positive meniscus lens element 24 having the convex surface facing the object side is provided as the final lens.

TABLE 2

$F_{NO} = 1:2.8$
$f = 5.45$
$W = 33.9$
$f_B = 7.31 \, (d_{13} + d_{14}/1.51633)$
$D_{AS} = 5.33$
$\Delta V_{asp} = -0.478$

| Surface No. | R | D | Nd | ν |
|---|---|---|---|---|
| 1* | 10.075 | 1.20 | 1.66910 | 55.4 |
| 2 | 4.483 | 1.35 | — | — |
| 3 | 7.500 | 1.10 | 1.69895 | 30.1 |

TABLE 2-continued $F_{NO} = 1:2.8$
$f = 5.45$
$W = 33.9$
$f_B = 7.31 \, (d_{13} + d_{14}/1.51633)$
$D_{AS} = 5.33$
$\Delta V_{asp} = -0.478$

| Surface No. | R | D | Nd | ν |
|---|---|---|---|---|
| 4 | 3.894 | 2.18 | — | — |
| 5 | 11.798 | 2.10 | 1.84666 | 23.8 |
| 6 | −168.590 | 2.13 | — | — |
| Diaphragm | ∞ | 3.21 | — | — |
| 7 | −19.500 | 2.25 | 1.81600 | 46.6 |
| 8 | −6.892 | 0.12 | — | — |
| 9 | 23.370 | 3.16 | 1.60311 | 60.7 |
| 10 | −5.249 | 1.20 | 1.84666 | 23.8 |
| 11 | −34.871 | 0.10 | — | — |
| 12 | 11.592 | 1.89 | 1.80400 | 46.6 |
| 13 | 29.850 | 4.01 | — | — |
| 14 | ∞ | 5.00 | 1.51633 | 64.1 |
| 15 | — | — | — | — |

*indicates the aspherical surface which is symmetrical with respect to the optical axis.

The aspherical data (aspherical coefficients which are not indicated are zero):

No. 1: $K=0.00$, $A4=0.49358\times10^{-3}$, $A6=-0.49283\times10^{-6}$ $A8=0.24892\times10^{-6}$ Embodiment 3

Figure 5:
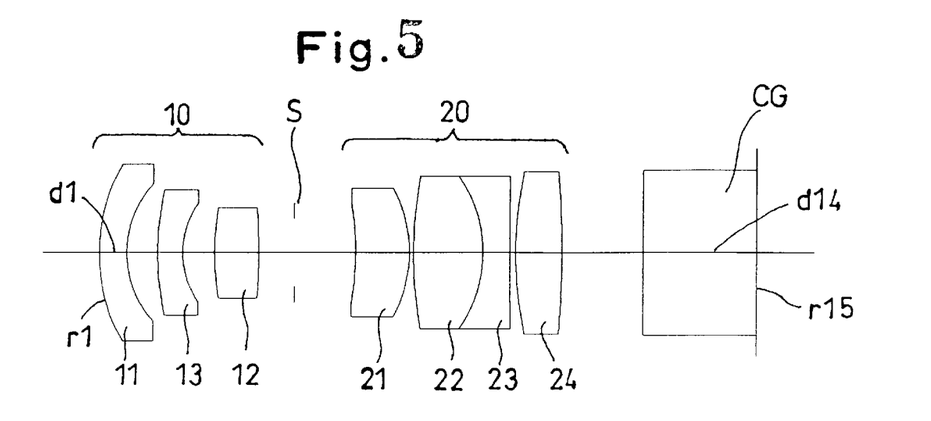
FIG. 5 is a lens arrangement of the third embodiment according to the present invention.
Figure 6A:
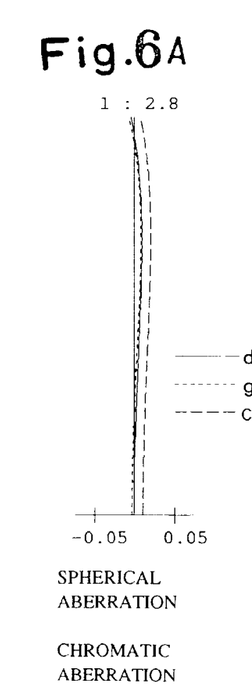
FIGS. 6A, 6B, 6C and 6D are aberration diagrams of the photographic lens system in FIG. 5.
Figure 6B:
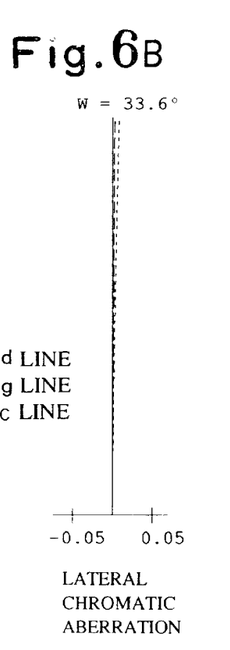
Figure 6C:
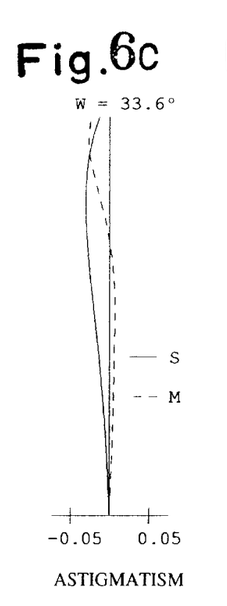
Figure 6D:
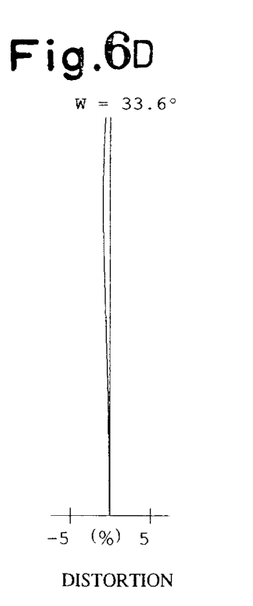

FIGS. 5 and 6 show the third embodiment of the photographic lens system according to the present invention. FIG. 5 is a lens arrangement, FIGS. 6A, 6B, 6C and 6D are aberration diagrams, and Table 3 shows the numerical data thereof. In comparison with the second embodiment, in the second lens group 20, instead of the positive meniscus lens element 24, a positive lens element 24 having the two convex surfaces is provided as the final lens.

TABLE 3

$F_{NO} = 1:2.8$
$f = 5.45$
$W = 33.6$
$f_B = 6.89 \, (d_{13} + d_{14}/1.51633)$
$D_{AS} = 5.53$
$\Delta V_{asp} = -0.338$

| Surface No. | R | D | Nd | ν |
|---|---|---|---|---|
| 1* | 8.663 | 1.20 | 1.66910 | 55.4 |
| 2 | 4.483 | 1.34 | — | — |
| 3 | 12.268 | 1.10 | 1.69895 | 30.1 |
| 4 | 3.752 | 1.39 | — | — |
| 5 | 11.306 | 1.93 | 1.84666 | 23.8 |
| 6 | −26.325 | 1.56 | — | — |
| Diaphragm | ∞ | 2.70 | — | — |
| 7 | −12.947 | 2.36 | 1.77250 | 49.6 |
| 8 | −5.830 | 0.18 | — | — |
| 9 | 18.093 | 3.08 | 1.60311 | 60.7 |
| 10 | −5.743 | 1.20 | 1.84666 | 23.8 |
| 11 | 211.464 | 0.26 | — | — |
| 12* | 14.228 | 2.11 | 1.75500 | 45.5 |
| 13 | −39.900 | 3.59 | — | — |
| 14 | ∞ | 5.00 | 1.51633 | 64.1 |
| 15 | ∞ | — | — | — |

*indicates the aspherical surface which is symmetrical with respect to the optical axis.

The aspherical data (aspherical coefficients which are not indicated are zero):

No. 1: K=0.00, A4=0.48167×10$^{-3}$, A6=0.34114×10$^{-5}$
A8=0.32663×10$^{-6}$

No. 12: K=−1.00, A4=−0.28000×10$^{-3}$, A6=0.46148×10$^{-5}$
A8=−0.22529×10$^{-6}$

Embodiment 4

Figure 7:
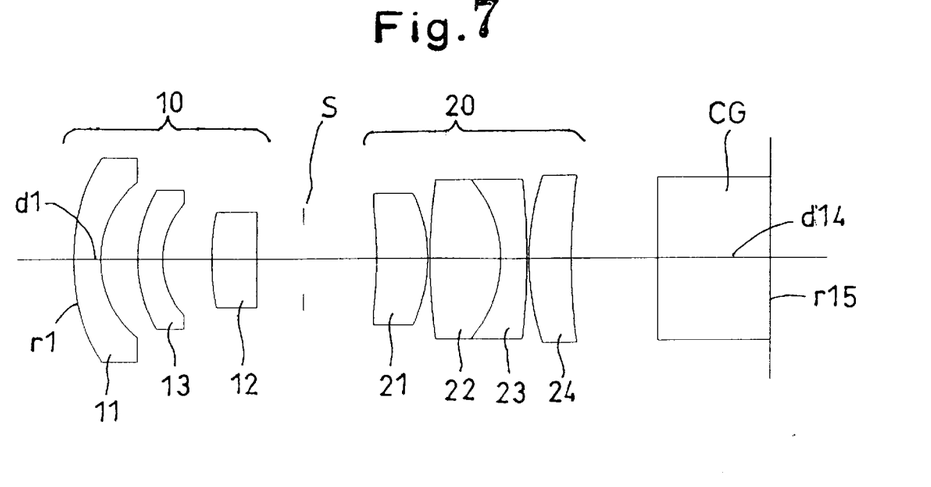
FIG. 7 is a lens arrangement of the fourth embodiment according to the present invention.
Figures 8A, 8B:
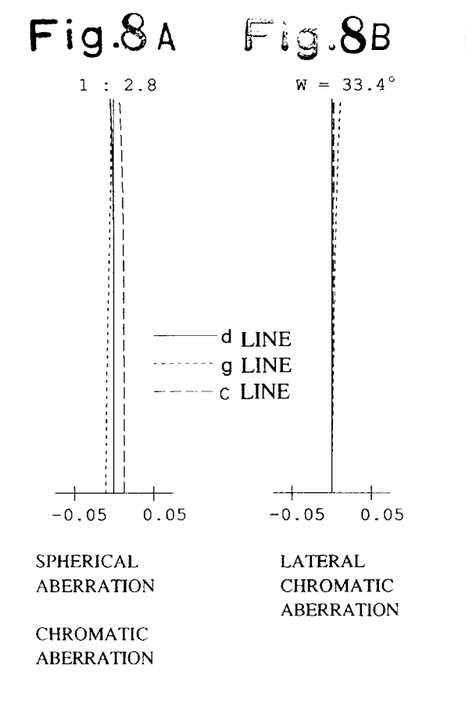
FIGS. 8A, 8B, 8C and 8D are aberration diagrams of the photographic lens system in FIG. 7.
Figure 8C:
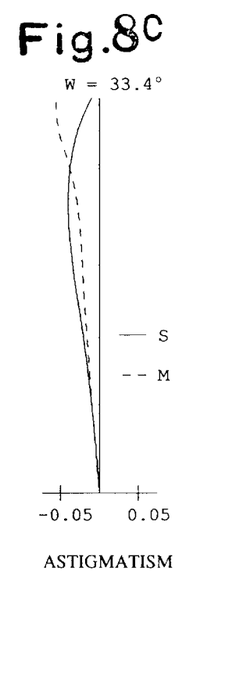
Figure 8D:
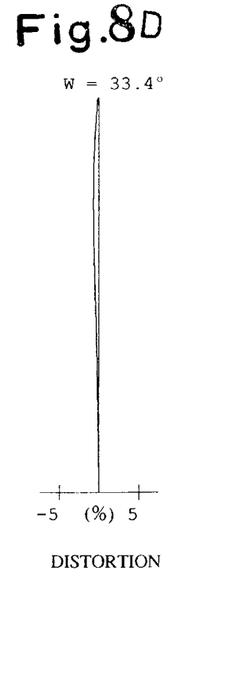

FIGS. 7 and 8 show the fourth embodiment of the photographic lens system according to the present invention. FIG. 7 is a lens arrangement, FIGS. 8A, 8B, 8C and 8D are aberration diagrams, and Table 4 shows the numerical data thereof. The basic lens construction is the same as the second embodiment.

TABLE 4

$F_{NO}$ = 1:2.8
f = 5.46
W = 33.4
$f_B$ = 7.17 (d13 + d14/1.51633)
$D_{AS}$ = 5.40
$\Delta V_{asp}$ = −0.566

| Surface No. | R | D | Nd | ν |
|---|---|---|---|---|
| 1* | 10.515 | 1.20 | 1.66910 | 55.4 |
| 2 | 4.483 | 1.63 | — | — |
| 3 | 6.123 | 1.10 | 1.69895 | 30.1 |
| 4 | 3.752 | 2.16 | — | — |
| 5 | 11.410 | 2.00 | 1.84666 | 23.8 |
| 6 | 177.690 | 2.07 | — | — |
| Diaphragm | ∞ | 3.22 | — | — |
| 7 | −18.483 | 2.25 | 1.81600 | 46.6 |
| 8 | −6.800 | 0.10 | — | — |
| 9 | 24.213 | 3.19 | 1.60311 | 60.7 |
| 10 | −5.249 | 1.20 | 1.84666 | 23.8 |
| 11 | −30.259 | 0.10 | — | — |
| 12 | 11.370 | 1.90 | 1.80400 | 46.6 |
| 13 | 28.360 | 3.87 | — | — |
| 14 | ∞ | 5.00 | 1.51633 | 64.1 |
| 15 | ∞ | — | — | — |

*indicates the aspherical surface which is symmetrical with respect to the optical axis.

The aspherical data (aspherical coefficients which are not indicated are zero):

No. 1: K=0.00, A4=0.52474×10$^{-3}$, A6=−0.12386×10$^{-5}$
A8=0.24732×10$^{-6}$

Embodiment 5

Figure 9:
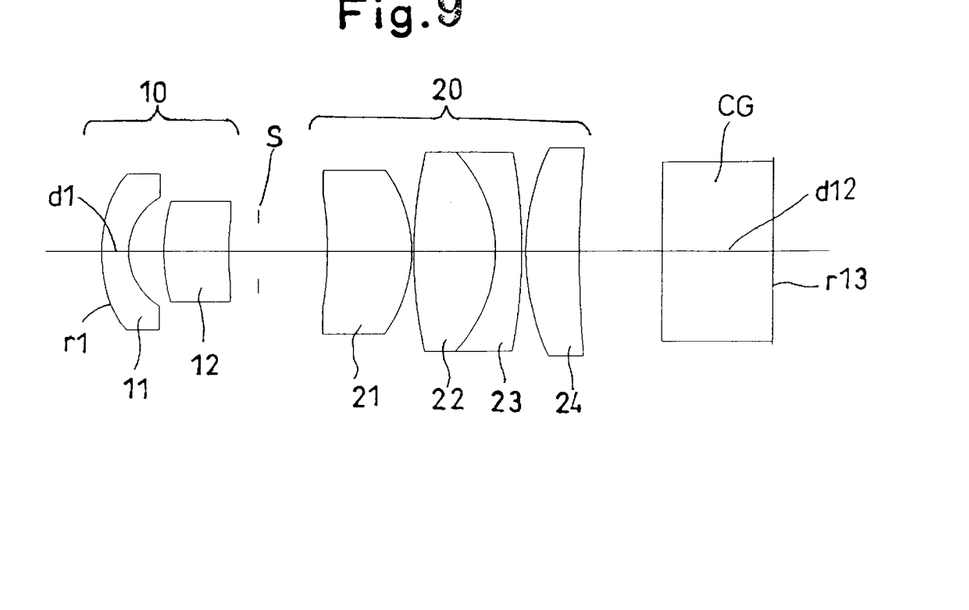
FIG. 9 is a lens arrangement of the fifth embodiment according to the present invention.
Figure 10A:
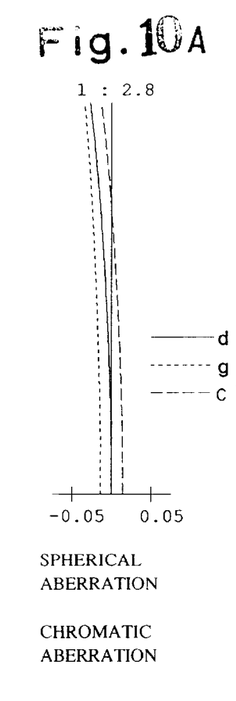
FIGS. 10A, 10B, 10C and 10D are aberration diagrams of the photographic lens system in FIG. 9.
Figure 10B:
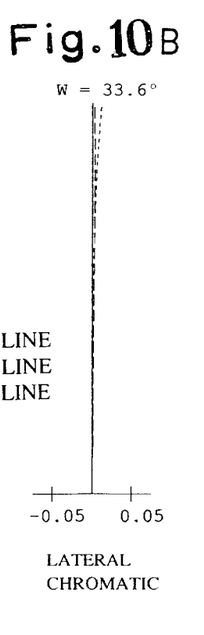
Figure 10C:
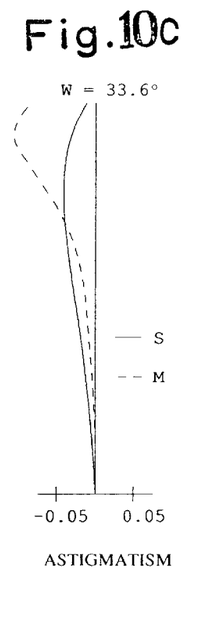
Figure 10D:
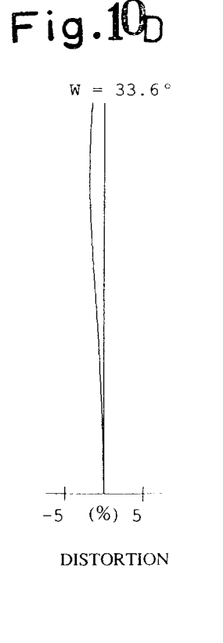

FIGS. 9 and 10 show the fifth embodiment of the photographic lens system according to the present invention. FIG. 9 is a lens arrangement, figures 10A, 10B, 10C and 10D are aberration diagrams, and Table 5 shows the numerical data. In comparison with the first embodiment, instead of the positive single lens element 12, a positive meniscus lens element 12 having the convex surface facing the object side is provided as the second lens element in the first lens group 10, and in the second lens group 20, instead of the positive single lens element 24, a positive meniscus lens element 24 having the convex surface facing the object side is provided as the final lens element.

TABLE 5

$F_{NO}$ = 1:2.8
f = 5.50
W = 33.6
$f_B$ = 7.06 (d11 + d12/1.51633)
$D_{AS}$ = 6.63
$\Delta V_{asp}$ = −0.506

| Surface No. | R | D | Nd | ν |
|---|---|---|---|---|
| 1* | 7.348 | 1.20 | 1.66910 | 55.4 |
| 2 | 2.850 | 1.55 | — | — |
| 3 | 8.313 | 2.87 | 1.84666 | 23.8 |
| 4 | 12.653 | 1.35 | — | — |
| Diaphragm | ∞ | 3.08 | — | — |
| 5 | −16.615 | 3.72 | 1.74100 | 52.7 |
| 6 | −6.296 | 0.10 | — | — |
| 7 | 20.755 | 3.68 | 1.56384 | 60.7 |
| 8 | −6.336 | 1.20 | 1.84666 | 23.8 |
| 9 | −23.152 | 0.20 | — | — |
| 10 | 10.991 | 2.41 | 1.69680 | 55.5 |
| 11 | 49.036 | 3.77 | — | — |
| 12 | — | 5.00 | 1.51633 | 64.1 |
| 13 | — | — | — | — |

*indicates the aspherical surface which is symmetrical with respect to the optical axis.

The aspherical data (aspherical coefficients which are not indicated are zero):

No. 1: K=0.00, A4=0.11561×10$^{-2}$, A6=0.91825×10$^{-5}$
A8=0.19270×10$^{-5}$

Table 6 shows the numerical data for each condition for embodiments 1 through 5.

TABLE 6

| | Emb. 1 | Emb. 2 | Emb. 3 | Emb. 4 | Emb. 5 |
|---|---|---|---|---|---|
| Cond. (1) | −2.896 | −3.255 | −3.385 | −3.281 | −2.018 |
| Cond. (2) | 1.320 | 1.447 | 1.386 | 1.419 | 1.252 |
| Cond. (3) | 0.789 | 0.677 | 0.732 | 0.697 | 0.963 |
| Cond. (4) | −0.454 | −0.478 | −0.338 | −0.566 | −0.506 |
| Cond. (5) | −0.983 | −1.266 | −1.069 | −1.246 | −1.145 |
| Cond. (6) | 25.8 | 36.9 | 36.9 | 36.9 | 36.9 |
| Cond. (7) | 0.07416 | 0.24355 | 0.24355 | 0.24355 | 0.28282 |

As can be clearly seen from Table 6, the embodiments 1 through 5 satisfy conditions (1) through (7).

According to the present invention, a small, compact photographic lens system having high optical performance, a long back focal distance and sufficient telecentricity has been attained at low cost.

What is claimed is:

1. A photographic lens system comprising a first lens group having negative refractive power, a diaphragm, and a second lens group having positive refractive power, in this order from the object, wherein said second lens group comprises:
a positive meniscus lens having the convex surface facing the image, a cemented sub-lens group comprising a positive lens element and a negative lens element, and a positive single lens element, in this order from the object; and wherein said photographic lens system satisfies the following conditions:

$1.5 < |f_1|/f < 5.0$ $1.1 < f_2/f < 2.0$ $0.621 \, D_{AS}/f_2 < 1.2$ wherein
   f designates the focal length of the entire optical system of said photographic lens system;
   $f_1$ designates the focal length of said first lens group;
   $f_2$ designates the focal length of said second lens group;
   $D_{AS}$ designates the distance from said diaphragm to the first principal point of said second lens group.

2. The photographic lens system according to claim 1, wherein at least one surface of a negative lens element in said first lens group is formed as an aspheric surface, and said aspheric surface satisfies the following condition:

$$1.0 < \Delta V_{asp} < -0.2$$

Wherein $\alpha V_{asp}$ designates the amount of change of the spherical aberration coefficient of said negative lens element of said first lens group due to said aspherical surface under the condition that the focal length of the entire lens system is converted to 1.0.

3. The photographic lens system according to claim 2, wherein said negative lens element having said aspheric surface is the most-object-side lens element in said first lens group, and wherein said aspheric surface is formed on the object side surface of said most-object-side lens element.

4. The photographic lens system according to claim 1, wherein said photographic system further satisfies the following condition:

$$-1.5 < R_{2-2}/f < -0.7$$

wherein
   $R_{2-2}$ designates the radius of curvature of the surface on the image side of said positive meniscus lens in said second lens group.

5. The photographic lens system according to claim 1, wherein said photographic lens system further satisfies the following conditions:

$$20 < v_p - v_n$$

$$0.05 < N_n - N_p < 0.35$$

wherein
   $vV_p$ designates the Abbe number, with respect to the d-line, of said positive lens element of said cemented sub-lens group in said second lens group;
   $v_n$ designates the Abbe number, with respect to the d-line, of said negative lens of said cemented sub-lens group in said second lens group;
   $N_p$ designates the refractive index, with respect to the d-line, of said positive lens of said cemented sub-lens group in said second lens group;
   $N_n$ designates the refractive index, with respect to the d-line, of said negative lens of said cemented sub-lens group in said second lens group .

6. The photographic lens system according to claim 1, wherein said second lens group functions as a focusing lens group.

* * * * *